(12) United States Patent
Maeda et al.

(10) Patent No.: US 9,834,266 B2
(45) Date of Patent: Dec. 5, 2017

(54) BODY COVER FOR STRADDLE TYPE VEHICLE, AND STRADDLE TYPE VEHICLE INCLUDING SAME

(71) Applicant: HONDA MOTOR CO., LTD., Minato-Ku, Tokyo (JP)

(72) Inventors: Rui Maeda, Wako (JP); Toru Sakai, Wako (JP); Shinya Yanagihara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 98 days.

(21) Appl. No.: 14/493,622

(22) Filed: Sep. 23, 2014

(65) Prior Publication Data

US 2015/0083512 A1   Mar. 26, 2015

(30) Foreign Application Priority Data

Sep. 26, 2013   (JP) ................. 2013-199653

(51) Int. Cl.
| | |
|---|---|
| B62J 17/00 | (2006.01) |
| B62K 11/04 | (2006.01) |
| B60K 13/04 | (2006.01) |
| B60K 11/04 | (2006.01) |

(52) U.S. Cl.
CPC ............ *B62J 17/00* (2013.01); *B62K 11/04* (2013.01); *B60K 11/04* (2013.01); *B60K 13/04* (2013.01); *B60Y 2200/12* (2013.01)

(58) Field of Classification Search
CPC .......... B62J 17/00; B60K 13/04; B62K 11/04
USPC .... 180/229, 219, 68.1, 68.2, 68.3, 68.4, 165
See application file for complete search history.

(56) References Cited

U.S. PATENT DOCUMENTS

| | | | | |
|---|---|---|---|---|
| 4,913,256 | A * | 4/1990 | Sakuma | ............... F02B 61/02 |
| | | | | 180/229 |
| 6,651,769 | B2 * | 11/2003 | Laivins | ............... B62J 15/00 |
| | | | | 180/229 |
| 7,387,180 | B2 * | 6/2008 | Konno | ............... B62J 17/06 |
| | | | | 180/219 |
| 2010/0000818 | A1 * | 1/2010 | Fukuyama | ............ B60T 8/3685 |
| | | | | 180/309 |

(Continued)

FOREIGN PATENT DOCUMENTS

| | | |
|---|---|---|
| JP | 7-025376 A | 1/1995 |
| JP | 2006-082727 A | 3/2006 |

(Continued)

*Primary Examiner* — Jacob D Knutson
(74) *Attorney, Agent, or Firm* — Carrier Blackman & Associates, P.C.; Joseph P. Carrier; Fucland P. Shende

(57) ABSTRACT

A straddle type vehicle includes a body cover having a side cover including a front member which covers a side of an engine, an upper member which covers a side of an area above the front member and of an area above and behind the front member and forward of a seat, and a rear member which covers an area below a side of the seat. The side cover is fastened to a body frame through a front fastening portion, a rear fastening portion, and an intermediate fastening portion positioned between the front and rear fastening portions. A shroud is arranged at a front portion of the side cover. The shroud includes an inner shroud supported by the body frame, and an outer shroud supported by the side cover. In such straddle type vehicle, the shroud can be fastened to a body frame through less number of fastening points.

20 Claims, 11 Drawing Sheets

(56) References Cited

U.S. PATENT DOCUMENTS

| | | | | |
|---|---|---|---|---|
| 2010/0096208 A1* | 4/2010 | Buell | ................ | F01P 3/18 |
| | | | | 180/229 |
| 2010/0181133 A1* | 7/2010 | Mitomi | ............... | B60K 13/02 |
| | | | | 180/229 |
| 2011/0180345 A1* | 7/2011 | Iida | ................ | B62K 11/04 |
| | | | | 180/309 |
| 2013/0015008 A1* | 1/2013 | Yama | ................ | B62J 35/00 |
| | | | | 180/68.6 |
| 2013/0026784 A1* | 1/2013 | Maeda | ............... | B62J 17/02 |
| | | | | 296/181.1 |
| 2013/0214553 A1* | 8/2013 | Tsukui | ............... | B62J 17/02 |
| | | | | 296/78.1 |
| 2015/0166137 A1* | 6/2015 | Yamazaki | ............ | B62J 23/00 |
| | | | | 280/304.3 |

FOREIGN PATENT DOCUMENTS

| | | | |
|---|---|---|---|
| JP | 2009-161027 A | 7/2009 |
| JP | 2010-162990 A | 7/2010 |
| JP | 2013-071675 A | 4/2013 |

* cited by examiner

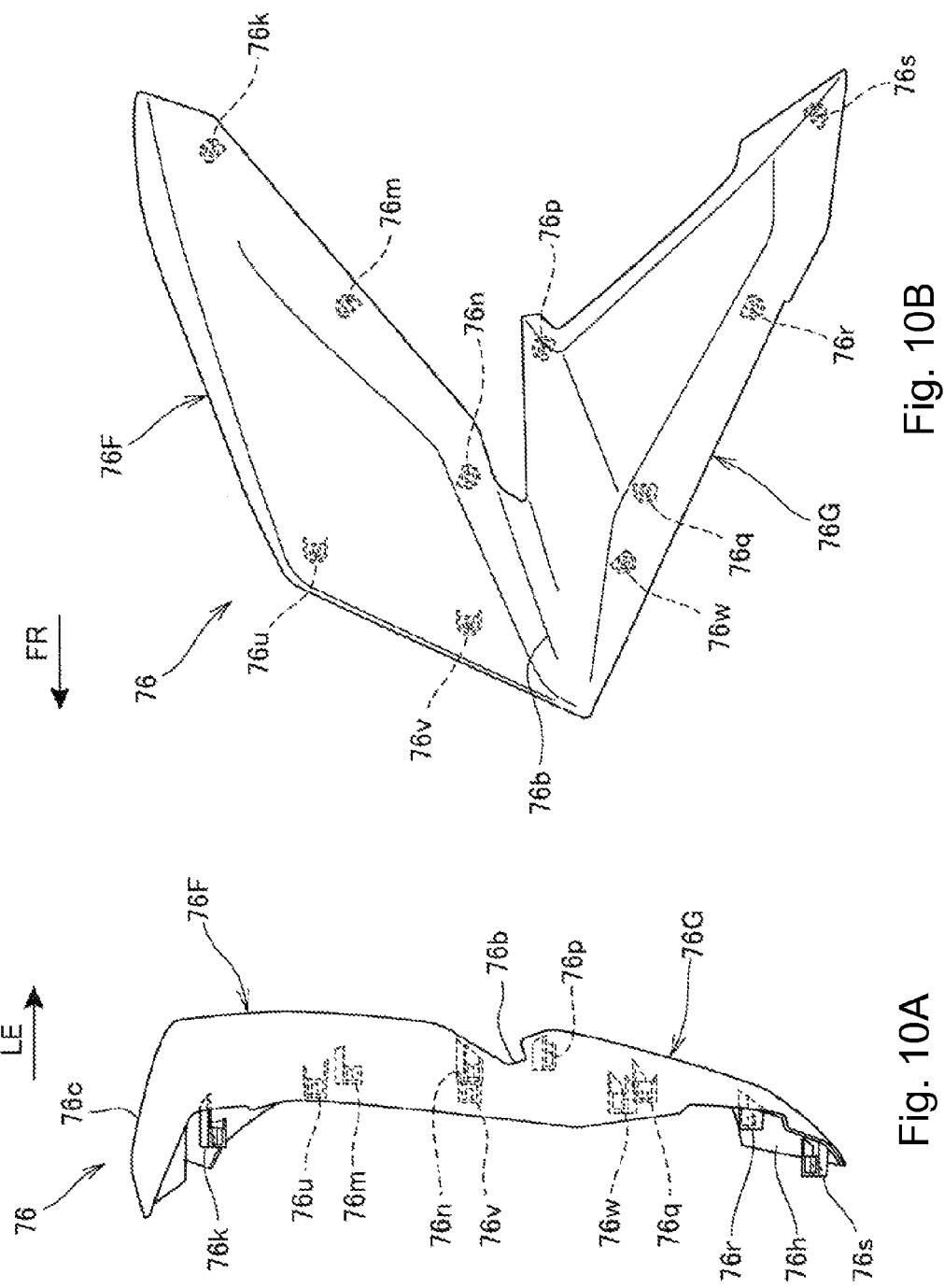

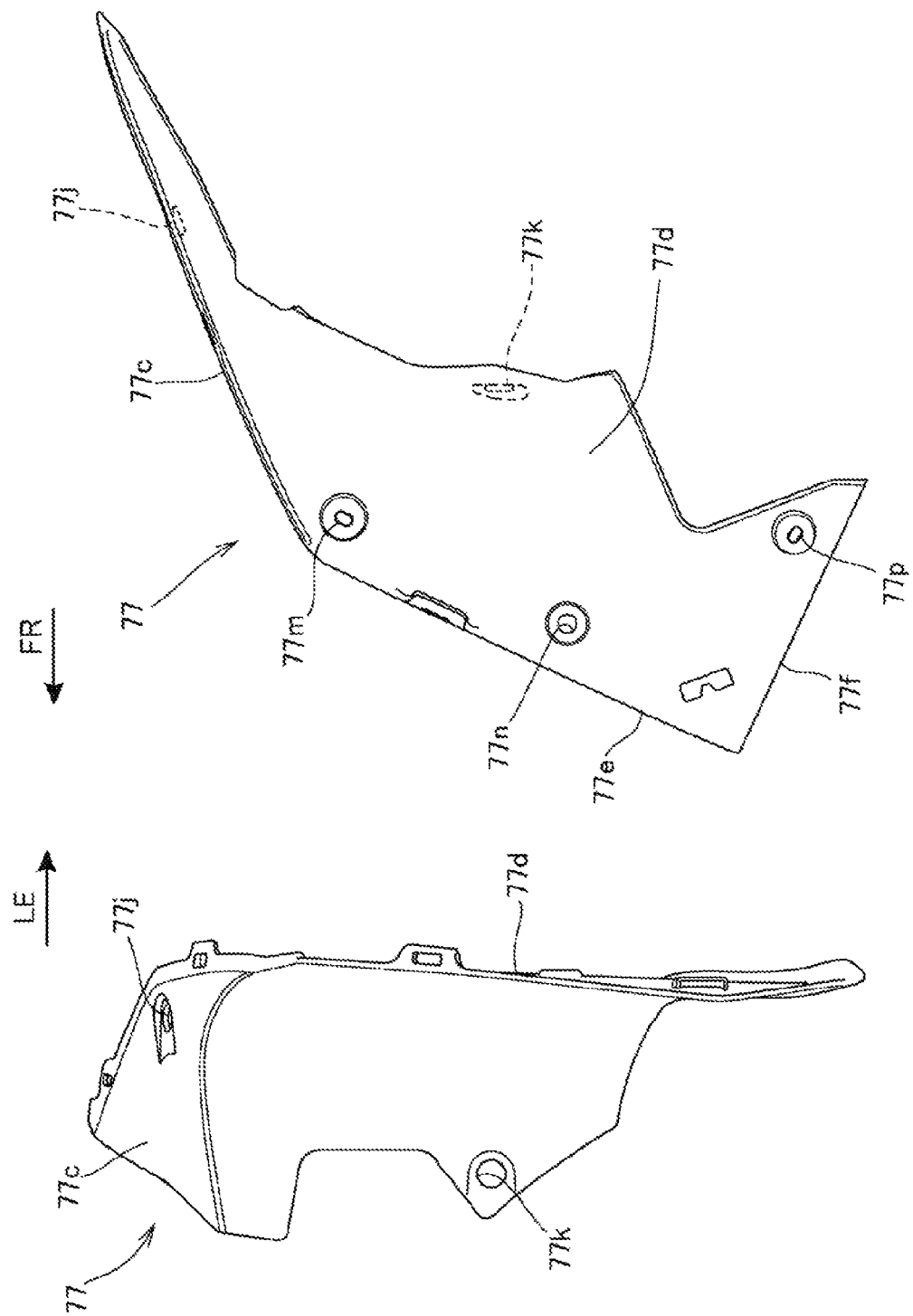

BODY COVER FOR STRADDLE TYPE VEHICLE, AND STRADDLE TYPE VEHICLE INCLUDING SAME

CROSS-REFERENCE TO RELATED APPLICATIONS

The present invention claims priority under 35 USC 119 based on Japanese Patent Application No. 2013-199653, filed on Sep. 26, 2013. The entire subject matter of this priority document, including specification claims and drawings thereof, is incorporated by reference herein.

BACKGROUND OF THE INVENTION

1. Field of the Invention

The present invention relates to a body cover for a straddle type vehicle, and to a straddle type vehicle including the same. More particularly, the present invention relates to a body cover having a shroud which is fastened to a body frame of a straddle type vehicle through less number of fastening points, and to a straddle type vehicle including the same.

2. Description of the Background Art

There is known a structure in which a shroud is enlarged in rear and lower directions so that it does not interfere with the occupant's legs. An example of such structure is disclosed in the Japanese Patent Application Publication No. Hei 7-25376.

Enlargement in the shroud requires more fastening points for fastening the shroud to a body frame and the like, which leads to increase in the number of parts or enlargement in the vehicle body size because the fastening portion protrudes in the vehicle width direction.

The present invention has been made in view of the above circumstance. Accordingly one of the objects of the present invention is to provide a straddle type vehicle whose shroud can be fastened to a body frame and the like through less fastening points.

SUMMARY OF THE INVENTION

Reference numbers are included in the following description corresponding to the reference numbers used in the drawings. Such reference numbers are provided for purposes of illustration, and are not intended to limit the invention.

In order to achieve the above objects, the present invention according to a first aspect thereof provides a straddle type vehicle including a steering system (12) provided in a front portion of a body frame (11), a power source (13) arranged behind the steering system (12), a seat (52) arranged behind and above the power source (13), footrests (68) provided on left and right sides below the seat (52), and a body cover (55) covering sides of the vehicle body from sides of the steering system (12) to areas below sides of the seat (52). The straddle type vehicle is characterized in that the body cover (55) includes: a side cover (71) having a front member (71D) covering a side of the power source (13), an upper member (71E) covering a side of an area above the front member (71D) and of an area above and behind the front member but forward of the seat (52), and a rear member (71F) covering an area below a side of the seat (52), the side cover (11) being fastened to the body frame (11) through a front fastening portion (71m), a rear fastening portion (71z), and an intermediate fastening portion (71y) positioned between the front and rear fastening portions (71m, 71z); and a shroud (72) arranged at a front portion of the side cover (71). The shroud (72) includes an inner shroud (77) and an outer shroud (76). The outer shroud (76) is supported by the side cover (71), while the inner shroud (77) is supported by the body frame (11).

The present invention according a second aspect thereof, in addition to the first aspect, is characterized in that the body frame (11) includes a head pipe (21) rotatably supporting the steering system (12), a main frame (22) extending rearward from the head pipe (21) and having a seat rail (24) connected thereto, and a down frame (27) extending downward from the head pipe (21) toward the front of the power source (13), and in the side cover (71), the front fastening portion (71m) may be supported by the down frame (27), and the rear fastening portion (71z) may be supported by the seat rail (24).

The present invention according a third aspect thereof, in addition to one of the first and second aspects, is characterized in that the shroud (72) may be arranged adjacent to the front fastening portion (71m).

The present invention according a fourth aspect thereof, in addition to one of the first through third aspects, is characterized in that the front fastening portion (71m) or rear fastening portion (71z) of the side cover (71) may be rubber mounted.

The present invention according a fifth aspect thereof, in addition to one of the first through fourth aspects, is characterized in that the shroud (72) is provided in a left and right pair, a radiator (81) is arranged between the left and right shrouds (72), an exhaust conduit (71k) opened rearward is provided in the side cover (71) behind the radiator (81), and an air exhaust channel (94) is provided so as to surround the exhaust conduit (71k).

The present invention according a sixth aspect thereof, in addition to the fifth aspect, is characterized in that a shield plate (71s), having a smaller area than the opening size of the exhaust conduit (71k) and protruding toward the inside of the vehicle body from the outer end of the exhaust conduit (71k), may be provided.

The present invention according a seventh aspect thereof, in addition to one of first through sixth aspects, is characterized in that the shroud (72) may be configured of the outer shroud (76) and the front portion of the side cover (71) in side view, and the side cover (71) may be exposed behind the outer shroud (76).

Effects of the Invention

According to the first aspect of the present invention, the body cover includes: the side cover having the upper member covering a side of the power source, the upper member covering a side of an area above the front member and of an area above and behind the front member but forward of the seat, and the rear member covering an area below a side of the seat, and being fastened to the body frame through the front fastening portion, the rear fastening portion, and the intermediate fastening portion positioned between the front and rear fastening portions; and the shroud supported by the front portion of the side cover. The shroud includes the inner shroud and the outer shroud, and the outer shroud is supported by the side cover, while the inner shroud is supported by the body frame. Hence, the large side cover extending from sides of the engine to areas below sides of the seat can be fastened successfully to the body frame. In particular, since the inner shroud of the shroud is supported by the body frame with the side cover in between, the shroud can be fastened to the body frame through less fastening points.

Moreover, according to the second aspect of the present invention, the body frame includes the head pipe rotatably supporting the steering system, the main frame extending rearward from the head pipe and having the seat rail connected thereto, and the down frame extending downward from the head pipe toward the front of the power source. Here, in the side cover, the front fastening portion is supported by the down frame, and the rear fastening portion is supported by the seat rail. Since the large side cover is arranged to extend longitudinally in the body frame, the fastening portions can be provided away from each other to exert a favorable fastening effect.

According to the third aspect of the present invention, since the shroud is arranged adjacent to the front fastening portion, the shroud is less likely to be deformed by traveling wind, and can be supported firmly.

According to the fourth aspect of the present invention, since the front fastening portion or rear fastening portion of the side cover is rubber mounted, strain of the large side cover is absorbed, and fastening workability can be improved.

According to the fifth aspect of the present invention, the shroud is provided in a left and right pair, the radiator is arranged between the left and right shrouds, the exhaust conduit opened rearward is provided in the side cover behind the radiator, and the air exhaust channel is provided so as to surround the exhaust conduit. Accordingly, the shroud can be used as a radiator shroud, and forming the exhaust conduit and the air exhaust channel integrally in the side cover allows smooth flow of exhaust air and reinforces the large side cover.

According to the sixth aspect of the present invention, the shield plate having a smaller area than the opening size of the exhaust conduit and protruding toward the inside of the vehicle body from the outer end of the exhaust conduit is provided. Hence, appearance can be improved by using the shield plate to shield wiring and the like arranged in front of the exhaust conduit.

According to the seventh aspect of the present invention, the shroud is configured of the outer shroud and the front portion of the side cover when viewed in side view, while the side cover is exposed behind the outer shroud. Accordingly, the outer shroud can be reduced in size and weight.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 10A is an explanatory drawing showing a front view of the outer shroud.

FIG. 10B is an explanatory drawing showing side view of the outer shroud.

FIG. 11A is an explanatory drawing showing a front view of the inner shroud.

FIG. 11B is an explanatory drawing showing a side view of the inner shroud.

DETAILED DESCRIPTION OF ILLUSTRATIVE EMBODIMENTS

Figure 1:
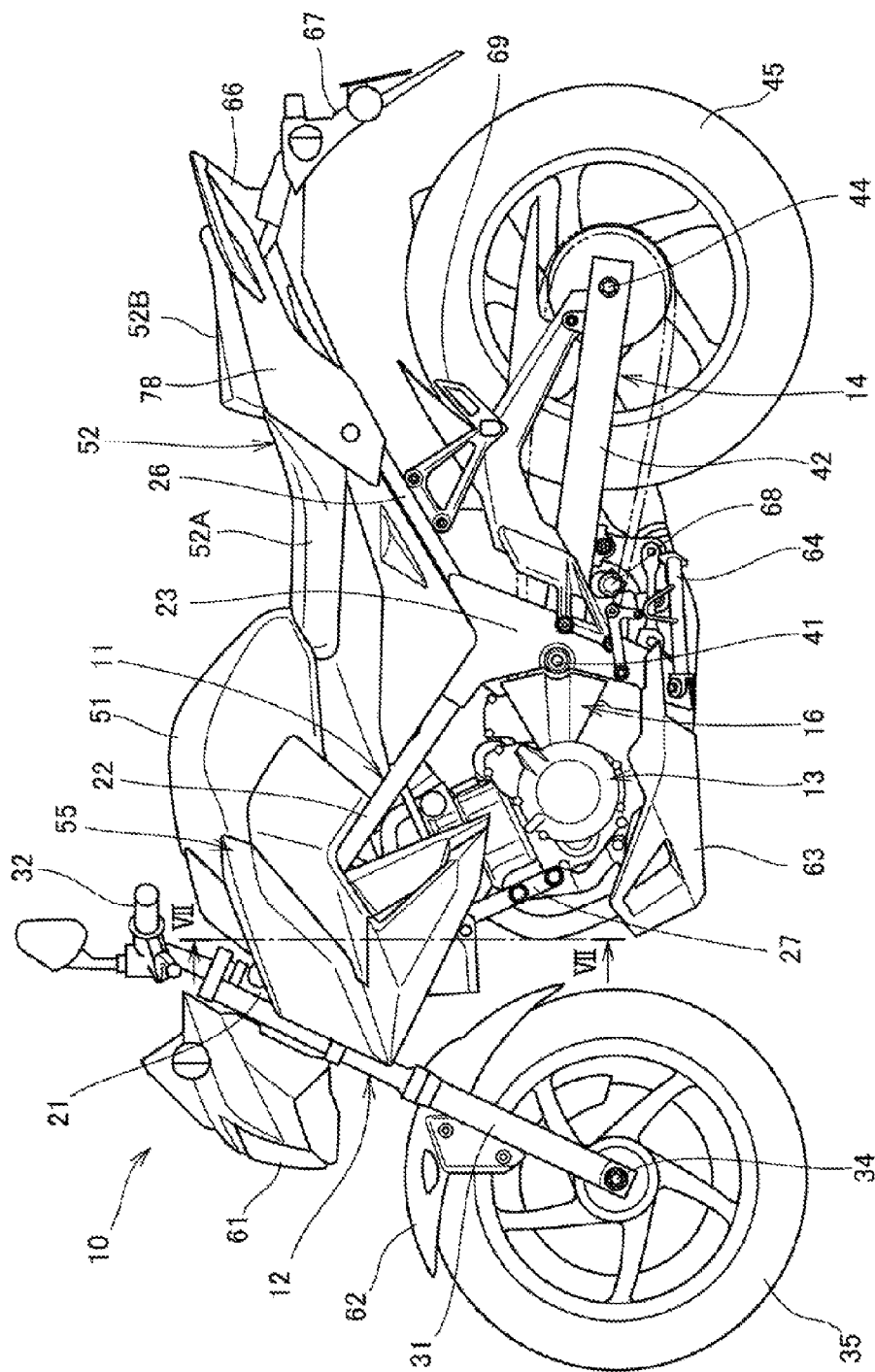
FIG. 1 is a left side view showing a motorcycle of according to an illustrative embodiment of the present invention.

An illustrative embodiment of the present invention will be described hereinafter in detail with reference to the accompanying drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

In other words, it may be noted that front, rear, left, right, upper and lower directions in the description are the same as directions relative to the vehicle body unless otherwise stated. In addition, in the drawings, reference character FR indicates the front of the vehicle body, reference character UP indicates the upper direction of the vehicle body, and reference character LE indicates the left of the vehicle body.

FIG. 1 is a left side view showing a motorcycle 10 according an illustrative embodiment of the present invention.

The motorcycle 10 is a straddle type vehicle. The motorcycle 10 includes a body frame 11 being the framework, a steering system 12 also serving as a front suspension provided in a front end portion of the body frame, an engine 13 supported by a center portion of the body frame 11, and a rear suspension 14 provided in a lower portion of the body frame 11.

The body frame 11 includes a head pipe 21, and left and right pairs (only the configurations on the near side are shown) of main frames 22, center frames 23, seat rails 24 (see FIG. 2), subframes 26, and down frames 27.

The head pipe 21 constitutes the front end portion of the body frame 11. The head pipe 21 rotatably supports the steering system 12. The main frame 22 extends obliquely downward in the rear direction from the head pipe 21. The center frame 23 extends substantially downward from a rear end portion of the main frame 22. The seat rail 24 extends obliquely upward in the rear direction from a middle portion of the main frame 22. The subframe 26 extends obliquely upward in the rear direction from a top end portion of the center frame 23, and has its rear end portion fixed to a lower portion of the seat rail 24. The down frame 27 extends obliquely downward in the rear direction from the head pipe 21 at a larger angle of inclination than the main frame 22.

The steering system 12 includes a front fork 31 rotatably supported by the head pipe 21, and a bar handle 32 fixed on an upper end portion of the front fork 31. A front wheel 35 is rotatably supported by a bottom end portion of the front fork 31 through an axle 34. The front fork 31 constitutes a suspension system suspending the front wheel 35.

The engine 13 integrally includes a transmission 16 in its rear portion. The engine 13 is supported by the main frames 22, center frames 23, and down frames 27 of the body frame 11.

The rear suspension 14 includes a pivot shaft 41 provided so as to penetrate the paired left and right center frames 23, swing arms 42 supported by the pivot shaft 41 in a vertically-swingable manner, and rear cushion units (not shown) bridged across the body frame 11 and each of the swing arms 42. A rear wheel 45 is rotatably supported at rear end portions of the swing arm 42 through an axle 44.

A fuel tank 51 is attached to upper portions of the main frames 22. A seat 52 is attached to upper portions of the seat rails 24. The seat 52 includes a rider's seat 52A arranged behind the fuel tank 51, and a passenger's seat 52B arranged behind the rider's seat 52A.

A body cover 55 covering both sides of the vehicle body is provided so as to extend from both sides of the front fork 31 to areas below both side edges of the seat 52, while also covering both sides of front portions of the main frames 22, both sides of front portions of the down frames 27, and both sides of a front portion of the fuel tank 51.

The motorcycle 10 further includes a head light 61, a front fender 62 covering the front wheel 35 from above, an under cover 63 covering the engine 13 from below, a side stand 64, a tail lamp 66, a rear fender 67 covering the rear wheel 45 from above, and rider's footrests 68 and passenger's footrests 69 provided on left and right sides below the seat 52.

Figure 2:
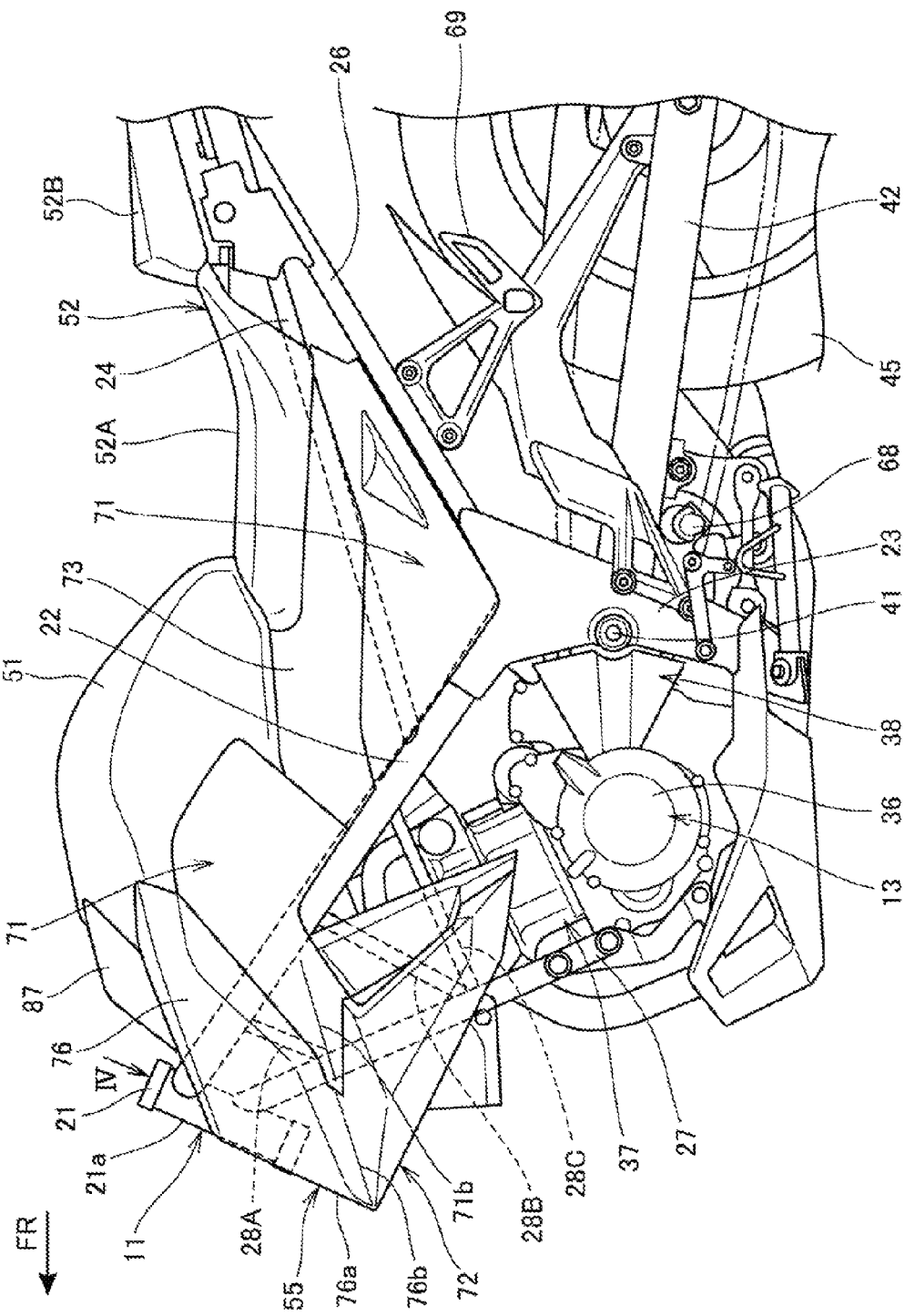
FIG. 2 is a left side view showing a main portion of the motorcycle.

FIG. 2 is a left side view showing a main portion of the motorcycle 10.

The body frame 11 includes reinforcement frames 28A, 28B, 28C bridged across the main frames 22 and the down frames 27.

The engine 13 includes a crankcase 36 and a cylinder portion 37 raised on the crankcase 36. The engine 13 is a drive source in which a transmission 38 is integrally provided in a rear portion of the crankcase 36.

The body cover 55 includes: paired left and right side covers 71 integrally extending from the head pipe 21 side to areas below side edges of the seat 52 (specifically, the rider's seat 52A) to cover sides of the vehicle body; paired left and right shrouds 72 covering front portions of the side covers 71 from the side; another side covers 73 covering rear top portions of the side covers 71 from the side; and paired left and right rear body covers 78 (see FIG. 1) extending from the areas below the side edges of the seat 52 to sides in front of the tail lamp 66.

The shroud 72 includes an outer shroud 76 attached to an outer side of the front portion of the side cover 71, and an inner shroud 77 (see FIG. 3) arranged inside the front portion of the side cover 71. The outer shroud 76 has a substantial V shape tilted sideways in side view. The outer shroud 76 has a front edge 76a which substantially coincides with a front edge 21a of the head pipe 21 in side view, and a side groove portion 76b which extends upward in the rear direction is formed in the corner of the V shape. The side groove portion 76b continues, in a manner as to form a straight line, into a groove portion 71b formed in the side cover 71 and extending upward in the rear direction. It will be understood from FIGS. 2 and 7 that the outer shroud 76 is supported by said side cover 71, and the inner shroud 77 is supported by said body frame 11.

Figure 3:
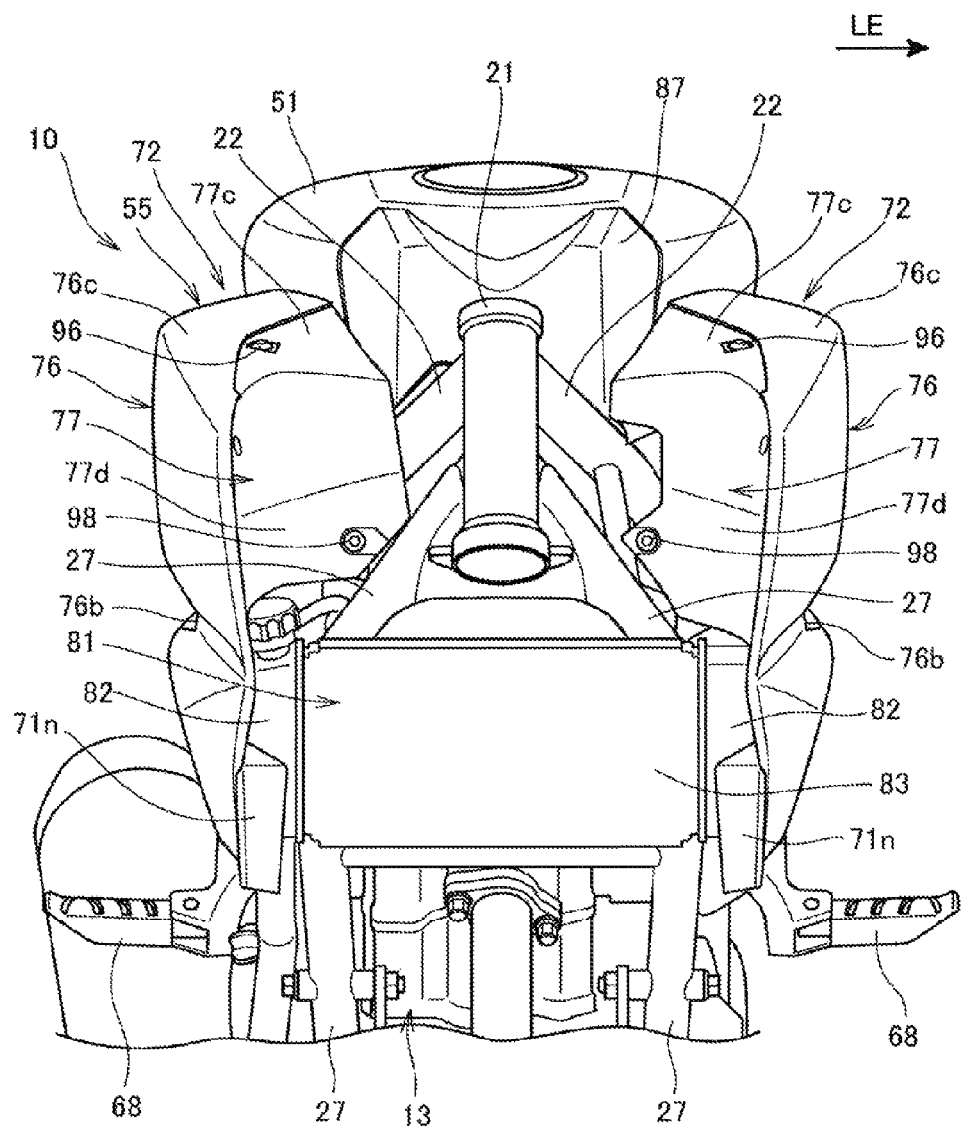
FIG. 3 is a front view showing a main portion of the motorcycle.

FIG. 3 is a front view showing a main portion of the motorcycle 10.

Paired left and right inner shrouds 77, 77 positioned at sides of the left and right main frames 22, 22 and the left and right down frames 27, 27 are provided in an upper area between the left and right outer shrouds 76, 76, so as to keep the inside of the body cover 55 from being exposed. Additionally, a horizontally wide radiator 81 is arranged in a lower area between the left and right outer shrouds 76, 76.

As shown in FIG. 3, the left and right outer shrouds 76, 76 are arranged such that top ends thereof are positioned at an intermediate point of the fuel tank 51 in a height direction, and bottom ends thereof are arranged substantially at the height of the bottom end of the radiator 81.

The radiator 81 is attached to front portions of the left and right down frames 27, 27, and is configured of paired left and right tank portions 82, 82, and a core portion 83 provided between the paired left and right tank portions 82, 82. The tank portion 82 is a part for temporarily reserving cooling water, while the core portion 83 includes multiple cooling channels for connecting the left and right tank portions 82, 82, and multiple radiating fins provided between adjacent cooling channels. The size of the core portion 83 is substantially the same as the gap between lower portions of the left and right down frames 27, 27, the left and right tank portions 82, 82 are positioned outside the left and right down frames 27, 27 in the vehicle width direction, and the front portion of the side cover 71 (see FIG. 2) as well as the outer shrouds 76, 76 are arranged outside the tank portions 82, 82 in the vehicle width direction.

Figure 4:
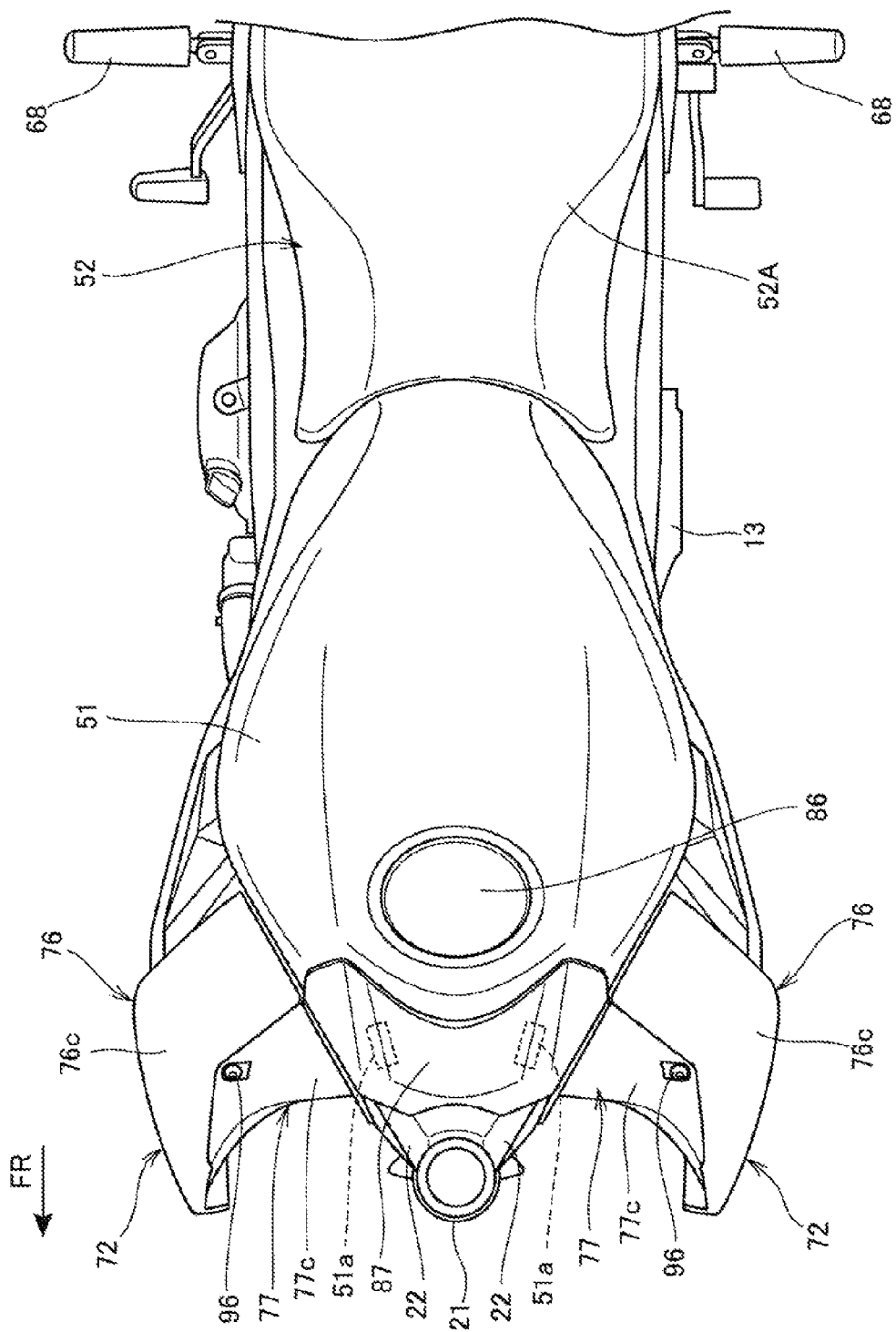
FIG. 4 is a view on arrow IV of FIG. 2.

FIG. 4 is a view on arrow IV of FIG. 2 as seen in the axial direction of the head pipe 21.

The outer shrouds 76, 76 respectively have substantially V-shaped top walls 76c, 76c extending toward the vehicle front in plan view, and top walls 77c, 77c of the inner shrouds 77, 77 are arranged inside the top walls 76c, 76c in the vehicle width direction. The top walls 76c, 76c and top walls 77c, 77c form continuous faces, so that each of the left and right shrouds 72, 72 appears as one piece. A cap cover 86 is configured to cover a cap closing a filler port of the fuel tank 51. A tank front cover 87 is configured to cover a front portion of the fuel tank 51 from above. The tank front cover 87 is attached to cover attachment portions 51a, 51a provided in the front portion of the fuel tank 51.

Figure 5:
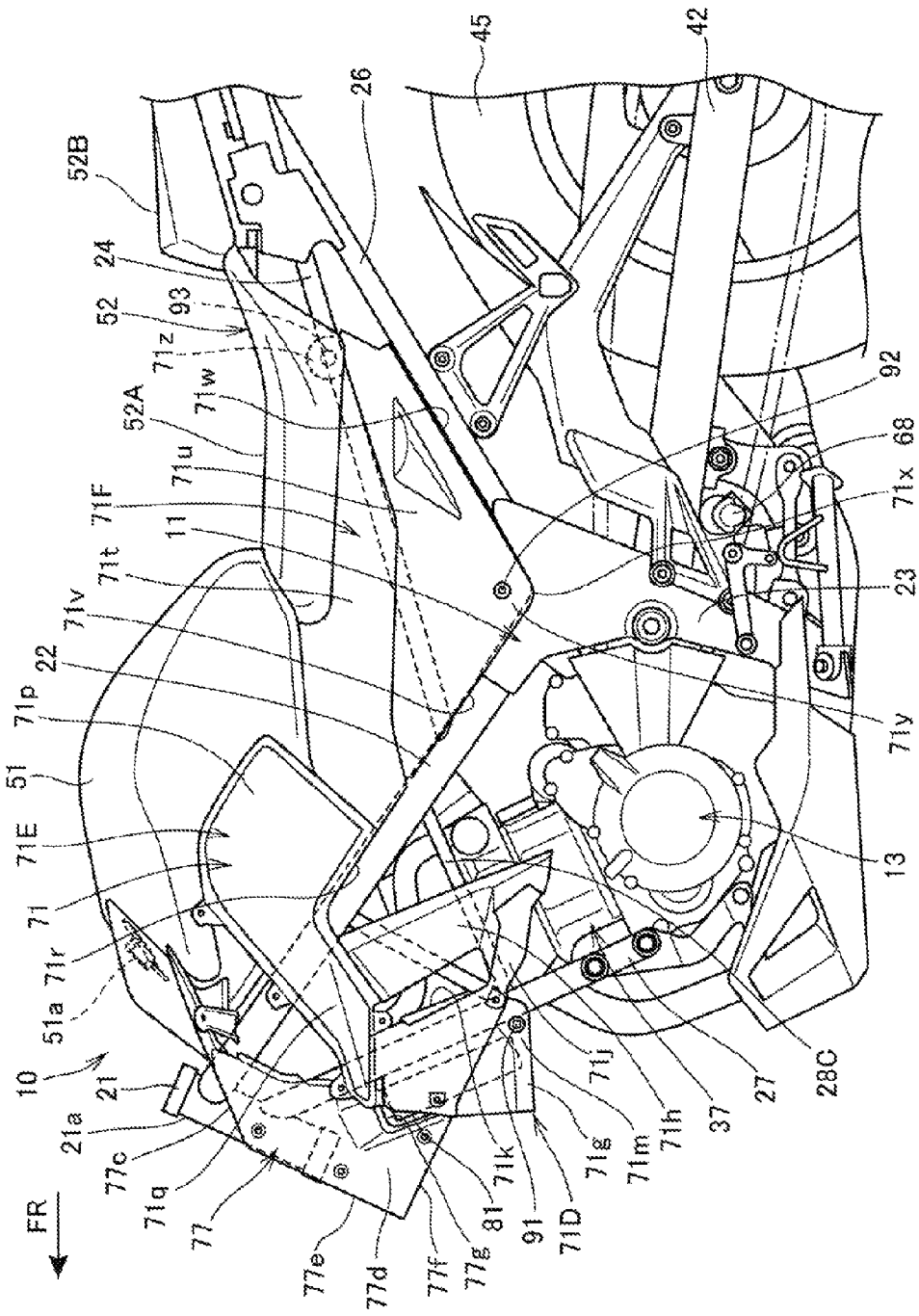
FIG. 5 is a left side view showing a state where an outer shroud is detached from the motorcycle shown in FIG. 2.

FIG. 5 is a left side view showing a state where the outer shroud 76 is detached from the motorcycle 10 shown in FIG. 2.

The side cover 71 includes: a front member 71D having a substantial U shape, when viewed in a side view, and covering a side of the radiator 81 and the cylinder portion 37 of the engine 13; an upper member 71E having a substantial L shape, when viewed in a side view and covering a side of an area above the front member 71D and of a lower portion of the fuel tank 51; and a rear member 71F having a substantial inverse triangular shape, when viewed in a side view, and covering a side of an area behind the upper member 71E and below the fuel tank 51 and seat 52.

The front member 71D is configured of: a front piece 71g positioned at a side of the radiator 81; a rear piece 71h positioned at a side of the cylinder portion 37; and a lower piece 71j connecting the bottom ends of the front piece 71g and rear piece 71h. An exhaust conduit 71k surrounded by the front piece 71g, rear piece 71h, lower piece 71j, and upper member 71E and discharging exhaust air of the radiator 81 from the inner side of the side cover 71 to the outer side thereof is opened in the front member 71D. The exhaust conduit 71k is opened toward the side and rear.

A front fastening portion 71m is provided in the bottom end of the front piece 71g to fasten the front piece 71g to the down frame 27, and is fastened to the down frame 27 with a bolt 91.

The upper member 71E is configured of: a middle piece 71p positioned at a side of the lower portion of the fuel tank 51; and an oblique piece 71q extending obliquely downward in the front direction from the middle piece 71p and provided adjacent to the front member 71D. A lower side 71r of the middle piece 71p extends along the top edge of the main frame 22.

The rear member 71F is configured of an upper piece 71t positioned on the fuel tank 51 and seat 52 side, and a lower piece 71u arranged adjacent to the lower side of the upper piece 71t.

The upper piece 71t extends in the longitudinal direction of the vehicle body. The lower piece 71u has a substantial inverse triangular shape where two oblique sides 71v, 71w configure the bottom edge. The oblique side 71v extends along the top edges of the main frame 22 and center frame 23, whereas the oblique side 71w extends along the top edges of the center frame 23 and subframe 26.

An intermediate fastening portion 71y for fastening the lower piece 71u to the center frame 23 is provided in the vicinity of a corner portion 71x configured of the two oblique sides 71v, 71w. The intermediate fastening portion 71y is fastened to the body frame 11 with a bolt 92. In addition, a rear fastening portion 71z for fastening the upper piece 71t to the seat rail 24 is provided in a rear end portion of the upper piece 71t. The rear fastening portion 71z is fastened to the seat rail 24 with a bolt 93.

As has been described, the front fastening portion 71m, intermediate fastening portion 71y, and rear fastening portion 71z are not arranged in a knee grip portion (the oblique piece 71q and upper piece 71t of the side cover 71, and the side of rear portion of the fuel tank 51). Hence, the knee grip portions do not protrude sideward, and are easier to grip with the knees.

The inner shroud 77 covers a lower portion of the head pipe 21 from the side, and a vertical wall 77d integrally extends downward from the top wall 77c. The top wall 77c extends downward in the front direction, a front edge 77e of the vertical wall 77d extends along the front edge 21a of the head pipe 21, and a bottom edge 77f of the vertical wall 77d extends upward in the front direction so as to be substantially orthogonal to the front edge 77e in side view. A notched portion 77g for avoiding interference with the radiator 81 is formed in a rear lower portion of the vertical wall 77d.

Figure 6:
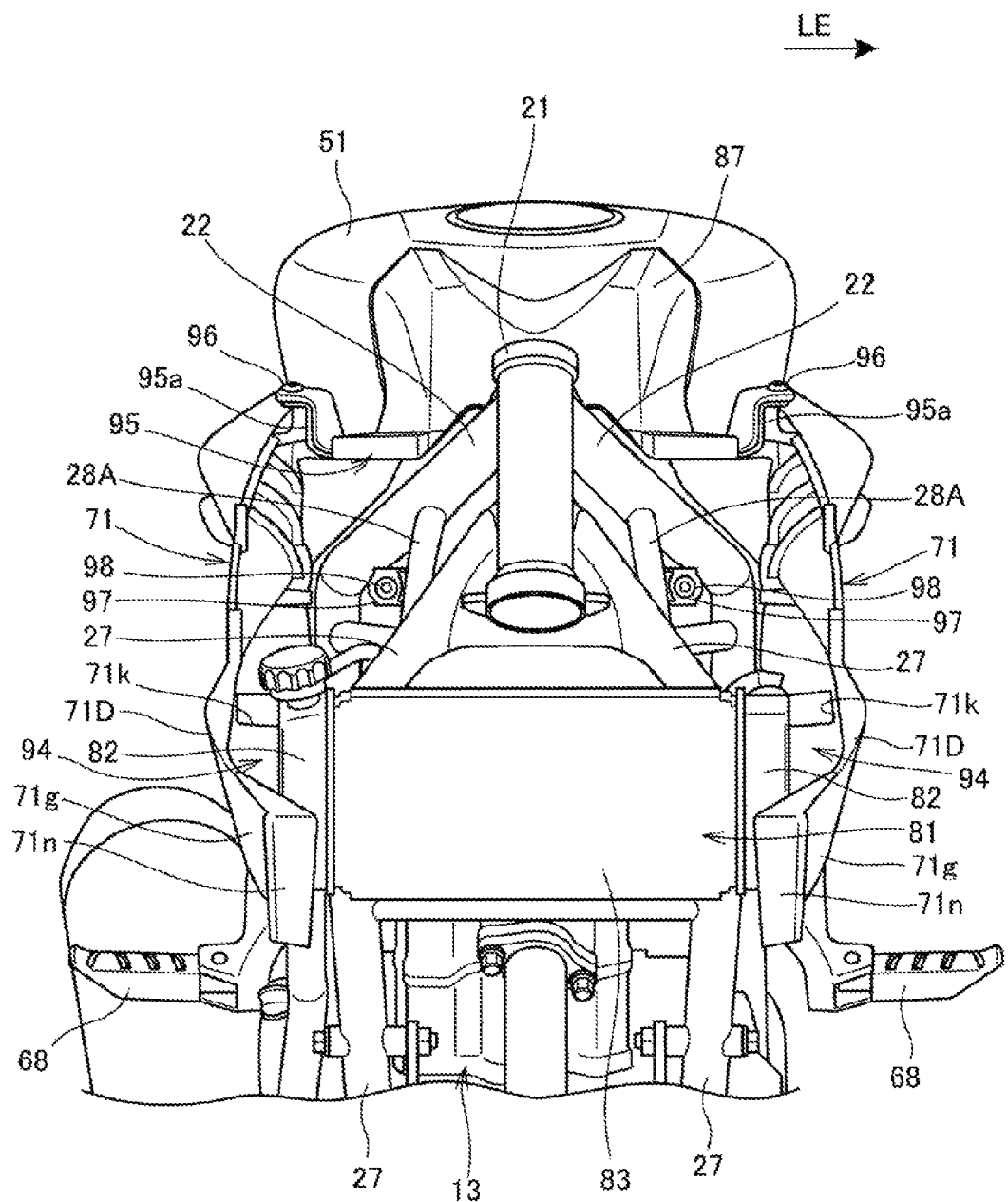
FIG. 6 is a front view showing a state where the shroud is detached from the state in FIG. 3.
Figure 7:
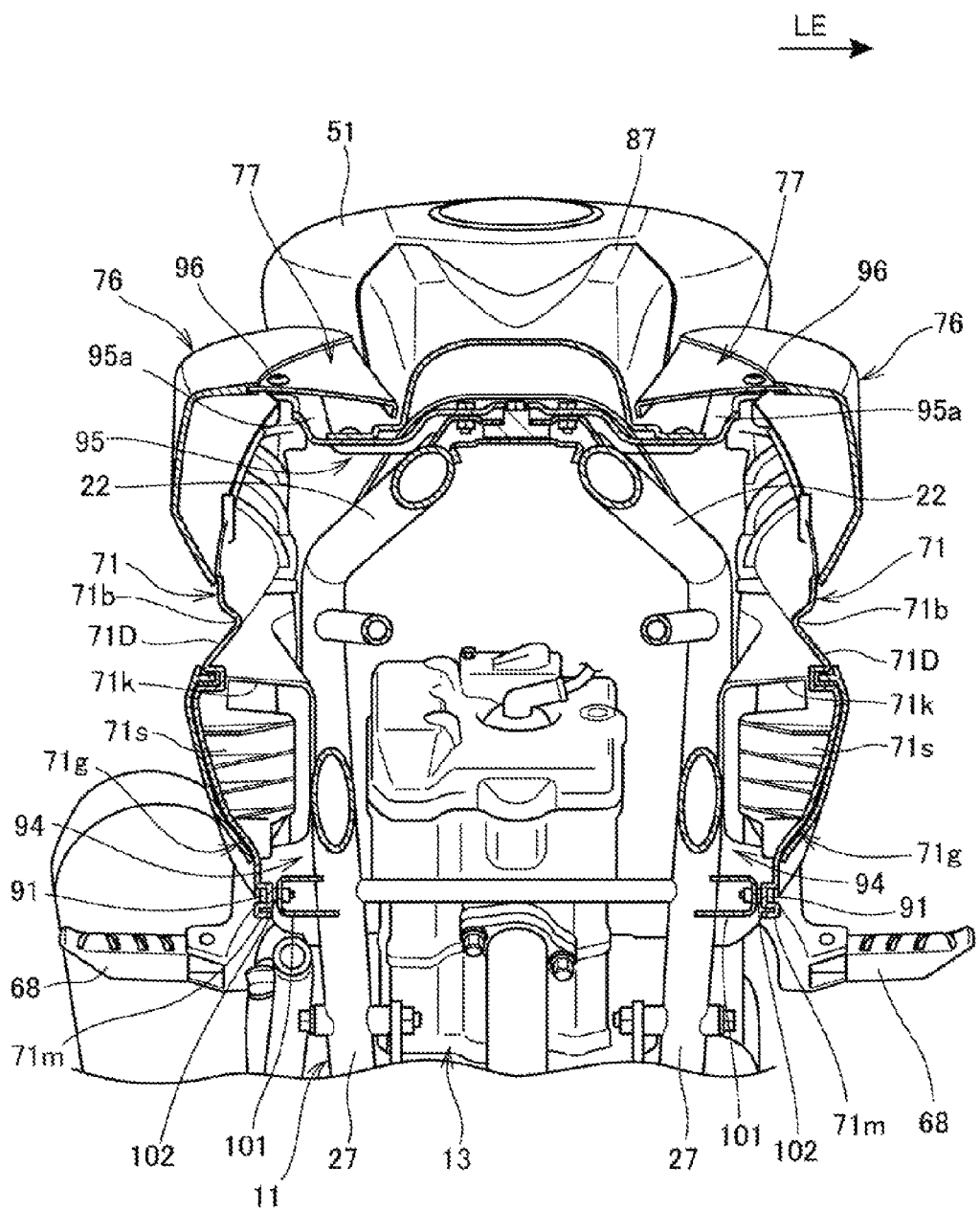
FIG. 7 is a cross sectional view taken along line VII-VII of FIG. 1.

FIG. 6 is a front view showing a state where the shrouds 72, 72 are detached from the state in FIG. 3. FIG. 7 is a cross sectional view taken along line VII-VII of FIG. 1.

As shown in FIG. 6, in the front member 71D of the side cover 71, the exhaust conduit 71k is opened toward the rear and outside in the vehicle width direction of an upper portion of the tank portion 82 of the radiator 81, so that exhaust air having passed through the radiator 81 can be discharged. In addition, front end portions 71n, 71n of the front pieces 71g, 71g of the front portions 71D extend inward in the vehicle width direction to cover, from the vehicle front, lower portions of the tank portions 82, 82 as well as portions where the radiator 81 is attached to the down frames 27, 27.

A stay 95 extended in the vehicle width direction for supporting upper portions of the left and right inner shrouds 77, 77 (see FIG. 3) is attached to upper portions of the left and right main frames 22, 22.

The stay 95 has bent portions 95a bent upward and sideward formed on its left and right ends, and a screw 96 is fixed into each of the bent portions 95a.

A bracket 97 protruding outward in the vehicle width direction is attached to a side portion of each of the left and right reinforcement frames 28A, 28A. A screw 98 is fixed into the bracket 97.

As shown in FIG. 7, the front fastening portion 71m or rear fastening portion 71z (see FIG. 5) of the side cover 71 is rubber mounted on the body frame 11. More specifically, in the case of the front fastening portion 71m, a cover bracket 101 is provided to the down frame 27 in a sideward-protruding manner, and the front fastening portion 71m is fixed to the cover bracket 101 with a bolt 91, via a rubber 102. The rear fastening portion 71z is rubber mounted by being fastened in a similar manner as the front fastening portion 71m.

The front piece 71g of the front member 71D of the side cover 71 integrally includes a shield plate 71s extending inward in the vehicle width direction from the front edge of the exhaust conduit 71k. The shield plate 71s has a smaller area than the exhaust conduit 71k, and has multiple ribs formed on its surface. Such assembly ensures rigidity of the shield plate 71s itself, and suppresses vibration due to vibration of the vehicle body. When the exhaust conduit 71k is seen from the side or from the side at an oblique angle from the rear of the side cover 71, the inner side of the side cover 71 is hardly recognizable because of the shield plate 71s. Hence, the appearance can be improved.

Additionally, use of the shield plate 71s ensures rigidity of the front piece 71g. An air exhaust channel 94 is provided so as to surround the exhaust conduit 71k around the shield plate 71s. The air exhaust channel 94 is formed inside the side cover 71 as a result of forming a groove portion 71b extending almost longitudinally in the side cover 71. Since the groove portion 71b is positioned higher than the radiator 81 (see FIG. 6), an upward flow (toward the rider) of exhaust air of the radiator 81 is not only blocked by the inner surface of the groove portion 71b, but also efficiently introduced to the exhaust conduit 71k.

Figure 8:
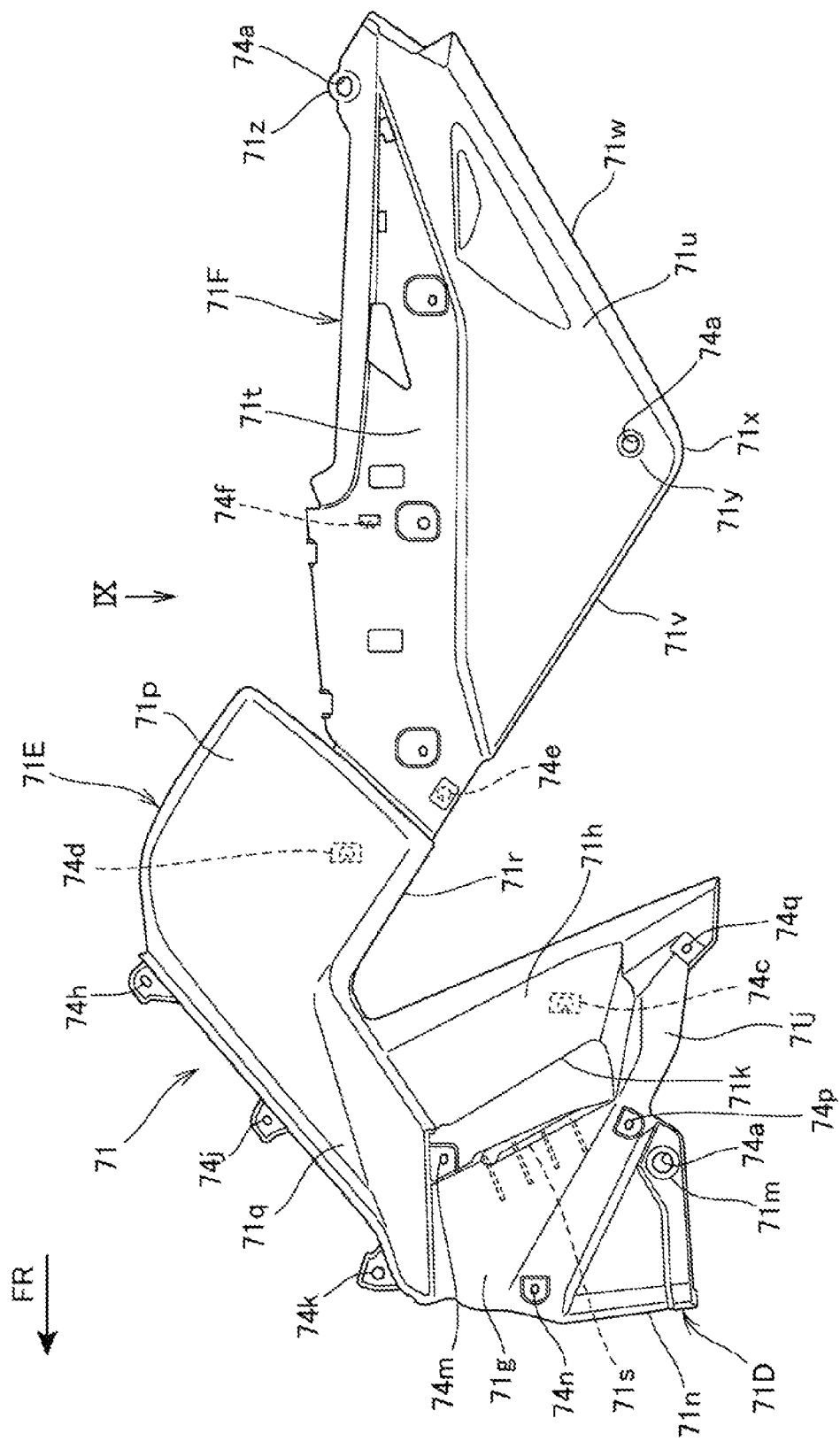
FIG. 8 is a side view of a side cover.
Figure 9:
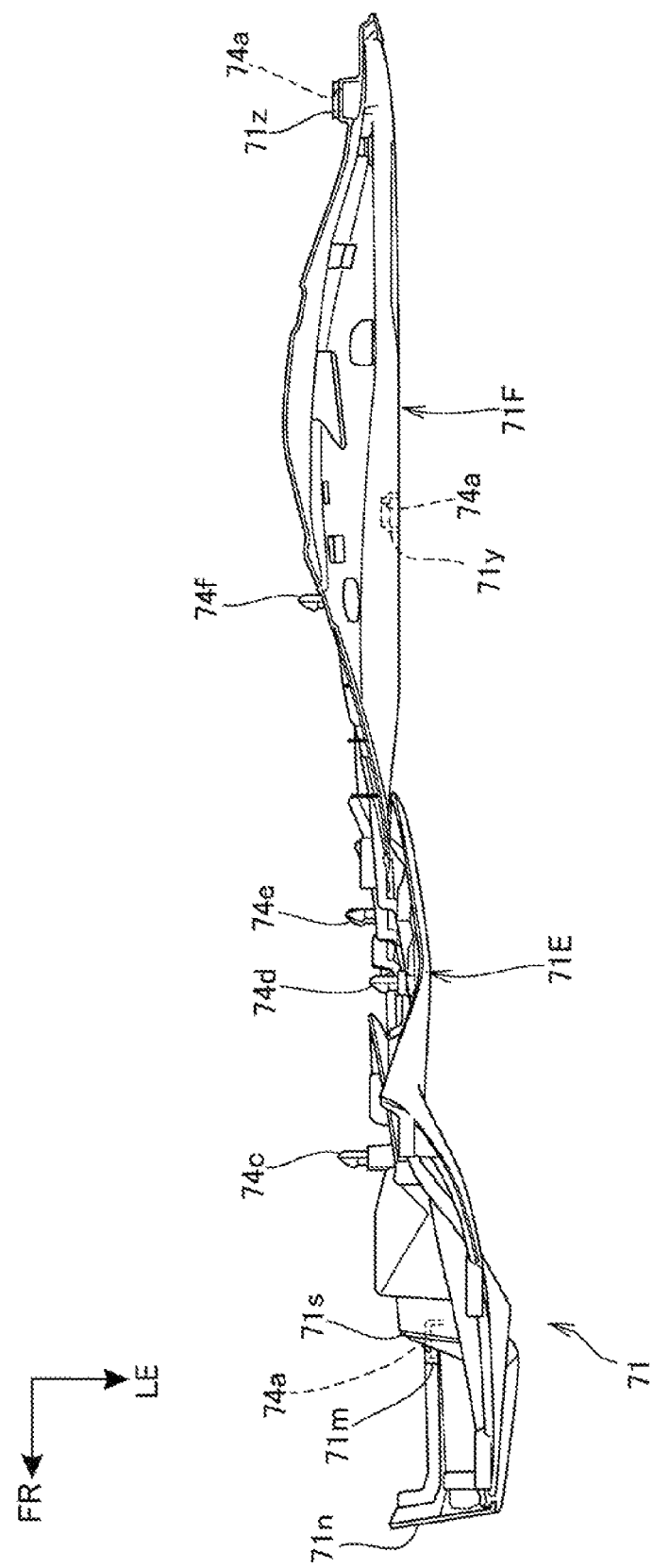
FIG. 9 is a view on arrow IX of FIG. 8.

FIG. 8 is a side view of the side cover 71. FIG. 9 is a view on arrow IX of FIG. 8.

As shown in FIG. 8, the side cover 71 includes, as fastening portions to be fastened to the body frame 11, the front fastening portion 71m in the front member 71D, as well as the intermediate fastening portion 71y and rear fastening portion 71z in the rear member 71F. Additionally, a bolt insertion hole 74a for inserting a fastening bolt is bored in each of the front fastening portion 71m, intermediate fastening portion 71y, and rear fastening portion 71z. The side cover 71, for example, may be formed of material including black polypropylene (PP).

As shown in FIGS. 8 and 9, multiple protrusions protruding toward the inside of the vehicle body are formed on the back of the side cover 71 as portions to be supported on the vehicle body side. Specifically, a first protrusion 74c is formed in the rear piece 71h of the front member 71D, a second protrusion 74d in the middle piece 71p of the upper member 71E, and third and fourth protrusions 74e and 74f in the upper piece 71t of the rear member 71F.

As shown in FIGS. 5, 8, and 9, the first protrusion 74c is fixed by being fitted into a fitting hole provided on the reinforcement frame 28C side, the second and fourth protrusions 74d and 74f are fixed by being fitted into fitting holes provided below the fuel tank 51, and the third protrusion 74e is fixed by being fitted into a fitting hole provided on the main frame 22 side.

As shown in FIG. 8, the shield plate 71s is formed along the front edge of the exhaust conduit 71k and extends further upward than the front edge. Thus, by forming the shield plate 71s at the front edge of the exhaust conduit 71k, lowered rigidity of the side cover 71 due to forming of the exhaust conduit 71k can be compensated.

FIGS. 10A and 10B are explanatory drawings of the outer shroud 76. FIG. 10A is a front view of the outer shroud 76. FIG. 10B is a side view of the outer shroud 76.

As shown in FIG. 10A, the outer shroud 76 is configured of an upper shroud portion 76F and lower shroud portion 76G into which the outer shroud is partitioned by the side groove portion 76b formed on its outer side.

The outer shroud 76 may be formed material including ABS resin.

The upper shroud portion 76F includes a top wall 76c extending toward the inside of the vehicle body at a top end thereof. The lower shroud portion 76G includes a lower wall 76h extending toward the inside of the vehicle body at a bottom end thereof.

As shown in FIG. 10B, the side grove portion 76b extends obliquely upward in the rear direction.

As shown in FIGS. 10A and 10B, multiple tapped holes into which screws are fixed when attaching the outer shroud 76 to the side cover 71 (see FIGS. 8 and 9) are formed in the back of the outer shroud 76. More specifically, a first tapped hole 76k, a second tapped hole 76m, and a third tapped hole 76n are formed in the upper shroud portion 76F. Meanwhile, a fourth tapped hole 76p, a fifth tapped hole 76q, a sixth tapped hole 76r, and a seventh tapped hole 76s are formed in the lower shroud portion 76G.

Referring to FIGS. 8 and 10B, a first screw insertion hole 74h, a second screw insertion hole 74j, a third screw insertion hole 74k, a fourth screw insertion hole 74m, a fifth screw insertion hole 74n, a sixth screw insertion hole 74p, and a seventh screw insertion hole 74q for inserting screws from the inside of the vehicle body are bored in the side cover 71, at positions respectively corresponding to the first tapped hole 76k, the second tapped hole 76m, the third tapped hole 76n, the fourth tapped hole 76p, the fifth tapped hole 76q, the sixth tapped hole 76r, and the seventh tapped hole 76s of the outer shroud 76.

As has been described, the outer shroud 76 is attached to the side cover 71 and the inner shroud 77, and thus is not directly fastened to the body frame 11 (see FIG. 5).

FIGS. 11A and 11B are explanatory drawings of the inner shroud 77. FIG. 11A is a front view of the inner shroud 77. FIG. 11B is a side view of the inner shroud 77.

As shown in FIGS. 11A and 11B, a screw insertion hole 77j into which the screw 96 (see FIG. 6) is inserted when attaching the inner shroud 77 to the stay 95 on the body frame 11 side (see FIG. 6) is bored in the top wall 77c of the inner shroud 77. In addition, a screw insertion hole 77k into which the screw 98 (see FIG. 6) is inserted when attaching the inner shroud 77 to the bracket 97 on the body frame 11 side (see FIG. 6) is bored in the vertical wall 77d of the inner shroud 77.

Moreover, screw insertion holes 77m, 77n, 77p into which screws are inserted for fastening with the outer shroud 76 (see FIGS. 10A and 10B) using the screws are bored in the vertical wall 77d.

The inner shroud 77 may be formed of material including ABS resin.

Referring to FIGS. 10B and 11B, shroud tapped holes 76u, 76v, 76w into which screws inserted through the screw insertion holes 77m, 77n, 77p are fixed are formed in the back of the outer shroud 76 at positions corresponding to the screw insertion holes 77m, 77n, 77p of the inner shroud 77.

As has been described, FIGS. 1, 2, 3, and 5 show the motorcycle 10 as the straddle type vehicle including: the steering system 12 provided in the front portion of the body frame 11; the engine 13 as a power source arranged behind the steering system 12; the seat 52 arranged behind and above the engine 13; the rider's footrests 68 provided on left and right sides below the seat 52; and the body cover 55 covering sides of the vehicle body from sides of the steering system 12 to areas below sides of the seat 52.

In the motorcycle of the present invention, the body cover 55 includes: the side cover 71 having the front member 71D covering a side of the engine 13, the upper member 71E covering a side of an area above the front member 71D and of an area above and behind the front portion but forward of the seat 52, and the rear member 71F covering an area below a side of the seat 52, and being fastened to the body frame 11 through the front fastening portion 71m, the rear fastening portion 71z, and the intermediate fastening portion 71y positioned between the front and rear fastening portions 71m, 71z; and the shroud 72 supported by a front portion of the side cover 71. The shroud 72 includes the inner shroud 77 and the outer shroud 76, and the outer shroud 76 is supported by the side cover 71, while the inner shroud 77 is supported by the body frame 11. It will be understood from FIGS. 5 and 7 that the side cover 71 is fastened to the body frame 11 through a maximum of three fastening portions including the front fastening portion 71m provided in a bottom end portion of said front member 71D, the rear fastening portion 71z provided in said rear member 71F, and the intermediate fastening portion 71y provided in said rear member 71F and positioned between the front and rear fastening portions 71m, 71z.

According to such configuration, the large side cover 71 extending from sides of the engine 13 to the area below sides of the seat 52 can be easily fastened to the body frame 11. In particular, since the outer shroud 76 of the shroud 72 is supported by the body frame 11 with the side cover 71 in between, the shroud can be fastened to the body frame 11 through less fastening points. The side cover 71 thus being one piece has higher rigidity than a side cover configured of multiple covers, and also can reduce the number of parts.

Moreover, the body frame 11 includes the head pipe 21 rotatably supporting the steering system 12, the main frame 22 extending rearward from the head pipe 21 and having the seat rail 24 connected thereto, and the down frame 27 extending downward from the head pipe 21 toward the front of the engine 13.

Here, in the side cover 71, the front fastening portion 71m is supported by the down frame 27, and the rear fastening portion 71z is supported by the seat rail 24. Since the large side cover 71 is arranged to extend longitudinally in the body frame 11, the fastening portions can be spaced far apart from each other to exert a favorable fastening effect.

In addition, since the shroud 72 is arranged adjacent to the front fastening portion 71m, the shroud 72 is less likely to be deformed by traveling wind, and can be supported firmly.

By preassembling the outer shroud 76 and inner shroud 77 in the aforementioned side cover 71, the assembly can be easily installed in the body frame 11, so that assembly man-hour can be reduced.

As shown in FIGS. 5 and 7, since the front fastening portion 71m or rear fastening portion 71z of the side cover 71 is rubber mounted, strain of the large side cover 71 is absorbed, and fastening workability can be improved.

Additionally as shown in FIGS. 3 and 6, the shroud 72 is provided in a left and right pair, the radiator 81 is arranged between the left and right shrouds 72, the exhaust conduit 71k opened rearward is provided in the side cover 71 behind the radiator 81, and the air exhaust channel 94 is provided so as to surround the exhaust conduit 71k. Accordingly, the shroud 72 can be used as a radiator shroud. Further, forming the exhaust conduit 71k and the air exhaust channel 94 integrally in the side cover 71 allows smooth flow of exhaust air and reinforces the large side cover 71.

As shown in FIG. 7, the shield plate 71s having a smaller area than the opening size of the exhaust conduit 71k and protruding toward the inside of the vehicle body from the outer end of the exhaust conduit 71k is provided. Hence, appearance can be improved by using the shield plate 71s to shield wiring and the like arranged in front of the exhaust conduit 71k.

Additionally as shown in FIGS. 2 and 5, the shroud 72 is configured of the outer shroud 76 and the front portion of the side cover 71 in side view, while the side cover 71 is exposed behind the outer shroud 76. Accordingly, the outer shroud 76 can be reduced in size and weight.

The above embodiment is merely one of the aspects of the present invention, and any modification or application can be made therein without departing from the gist of the invention.

Moreover, the present invention is not limited to the case of applying to the motorcycle 10, but is also applicable to straddle type vehicles including those other than the motorcycle.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

DESCRIPTION OF REFERENCE NUMERALS 10 motorcycle (straddle type vehicle)
11 body frame
12 steering system
13 engine (power source)
21 head pipe
22 main frame
24 seat rail
27 down frame
52 seat
55 body cover
68 rider's footrest (footrest)
71 side cover
71D front member
71E upper member
71F rear member
71k exhaust conduit
71m front fastening portion
71s shield plate
71y intermediate fastening portion
71z rear fastening portion
72 shroud
76 outer shroud
77 inner shroud
81 radiator.

What is claimed is:

1. A straddle type vehicle comprising:
a body frame forming a support member for a vehicle body;
a steering system provided in a front portion of the body frame;
a power source arranged behind the steering system;
a seat arranged behind and above the power source;
footrests provided below the seat on left and right sides; and
a body cover covering sides of the vehicle body from sides of said steering system to areas below sides of said seat;
wherein said body cover comprises
a side cover comprising
a front member which covers a side of said power source;
an upper member which covers a side of an area above the front member and of an area above and behind the front member, and forward of said seat; and
a rear member which covers an area below a side of said seat,
wherein said side cover is fastened to said body frame through a maximum of three fastening portions including a front fastening portion provided in a bottom end portion of said front member, a rear fastening portion provided in said rear member, and an intermediate fastening portion provided in said rear member and positioned between the front and rear fastening portions; and
a shroud arranged at a front portion of the side cover; said shroud comprising an outer shroud supported by said side cover, and an inner shroud supported by said body frame.

2. The straddle type vehicle according to claim 1, wherein said body frame comprises
a seat rail which supports said seat;
a head pipe which rotatably supports said steering system;
a main frame which extends rearward from the head pipe, and which has said seat rail connected thereto; and
a down frame which extends downward from said head pipe toward a front portion of said power source; and
wherein said front fastening portion is supported by said down frame, and said rear fastening portion is supported by said seat rail.

3. The straddle type vehicle according to claim 2, wherein said shroud is arranged adjacent to said front fastening portion.

4. The straddle type vehicle according to claim 2, wherein one of said front fastening portion and said rear fastening portion of said side cover is rubber mounted.

5. The straddle type vehicle according to claim 2, further comprising a radiator, an exhaust conduit which discharges exhaust air having passed through the radiator, and an exhaust channel;
wherein:
said shroud comprises a left shroud and a right shroud, each of said left shroud and said right shroud comprising said outer shroud and said inner shroud;
said radiator is arranged between the left and right shrouds;
the exhaust conduit which is opened rearward is provided in said side cover behind the radiator; and
the air exhaust channel surrounds the exhaust conduit.

6. The straddle type vehicle according to claim 2, wherein said outer shroud and the front portion of said side cover overlap each other, when viewed in side view; and
said side cover is exposed behind said outer shroud.

7. The straddle type vehicle according to claim 1, wherein said shroud is arranged adjacent to said front fastening portion.

8. The straddle type vehicle according to claim 7, wherein one of said front fastening portion and said rear fastening portion of said side cover is rubber mounted.

9. The straddle type vehicle according to claim 7, further comprising a radiator, an exhaust conduit which discharges exhaust air having passed through the radiator, and an exhaust channel;
   wherein:
   said shroud comprises a left shroud and a right shroud, each of said left shroud and said right shroud comprising said outer shroud and said inner shroud;
   said radiator is arranged between the left and right shrouds;
   the exhaust conduit which is opened rearward is provided in said side cover behind the radiator; and
   the air exhaust channel surrounds the exhaust conduit.

10. The straddle type vehicle according to claim 7, wherein
   said outer shroud and the front portion of said side cover overlap each other, when viewed in side view; and
   said side cover is exposed behind said outer shroud.

11. The straddle type vehicle according to claim 1, wherein one of said front fastening portion and said rear fastening portion of said side cover is rubber mounted.

12. The straddle type vehicle according claim 11, further comprising a radiator, an exhaust conduit which discharges exhaust air having passed through the radiator, and an exhaust channel;
   wherein:
   said shroud comprises a left shroud and a right shroud, each of said left shroud and said right shroud comprising said outer shroud and said inner shroud;
   said radiator is arranged between the left and right shrouds;
   the exhaust conduit which is opened rearward is provided in said side cover behind the radiator; and
   the air exhaust channel surrounds the exhaust conduit.

13. The straddle type vehicle according to claim 11, wherein
   said outer shroud and the front portion of said side cover overlap each other, when viewed in side view; and
   said side cover is exposed behind said outer shroud.

14. The straddle type vehicle according to claim 1, further comprising a radiator, an exhaust conduit which discharges exhaust air having passed through the radiator, and an exhaust channel;
   wherein:
   said shroud comprises a left shroud and a right shroud, each of said left shroud and said right shroud comprising said outer shroud and said inner shroud;
   said radiator is arranged between the left and right shrouds;
   the exhaust conduit which is opened rearward is provided in said side cover behind the radiator; and
   the air exhaust channel surrounds the exhaust conduit.

15. The straddle type vehicle according to claim 14, further comprising
   a shield plate having a smaller area than an opening size of said exhaust conduit, and protruding toward inside of the vehicle body from an outer end of said exhaust conduit.

16. The straddle type vehicle according to claim 1, wherein
   said outer shroud and the front portion of said side cover overlap each other, when viewed in side view; and
   said side cover is exposed behind said outer shroud.

17. A body cover for a straddle type vehicle, said vehicle comprising:
   a body frame forming a support member for a vehicle body;
   a steering system provided in a front portion of the body frame;
   a power source arranged behind the steering system; and
   a seat arranged behind and above the power source;
   said body cover comprising
   a side cover comprising
      a front member which covers a side of said power source;
      an upper member which covers a side of an area above the front member and of an area above and behind the front member; and
      a rear member which covers an area below a side of said seat;
      the side cover having a first fastening portion provided in a bottom end portion of said front member, a rear fastening portion provided in said rear member, and an intermediate fastening portion provided in said rear member and positioned between the front and rear fastening portions formed thereon for fastening said side cover to the body frame;
      wherein said side cover is fastened to said body frame through a maximum of three fastening portions including the front fastening portion, the rear fastening portion and the intermediate fastening portion; and
   a shroud arranged at a front portion of the side cover; said shroud comprising an inner shroud and an outer shroud, wherein said outer shroud is supported by said side cover, and said inner shroud is supported by said body frame.

18. The body cover for a straddle type vehicle according to claim 17, wherein:
   said shroud is arranged adjacent to said front fastening portion; and
   said side cover is exposed behind said outer shroud.

19. A body cover for a straddle type vehicle, said vehicle comprising:
   a body frame;
   a steering system provided in a front portion of the body frame;
   a power source arranged behind the steering system; and
   a seat arranged behind and above the power source;
   said body cover comprising
   a side cover including
      a front member which covers a side of said power source;
      an upper member which covers a side of an area above the front member and of an area above and behind the front member, and forward of said seat; and
      a rear member which covers an area below a side of said seat; and
   a shroud including an outer shroud supported by said front member, and an inner shroud supported by said body frame;
   wherein said front member has a front fastening portion formed thereon, said rear member has a rear fastening portion and an intermediate fastening portion formed thereon; and
   wherein said side cover including said front member, said upper member and said rear member are fastened to said body frame through a maximum of three fastening portions including said first fastening portion, said intermediate fastening portion and said rear fastening portion.

20. The body cover for a straddle type vehicle according to claim 19, wherein:

the body frame comprises
- a seat rail which supports said seat;
- a head pipe which rotatably supports said steering system;
- a main frame which extends rearward from the head pipe, and which has said seat rail connected thereto; and
- a down frame which extends downward from said head pipe toward a front portion of said power source; and said front fastening portion is supported by said down frame, and said rear fastening portion is supported by said seat rail.

* * * * *